US012050053B2

United States Patent
Gamalski et al.

(10) Patent No.: US 12,050,053 B2
(45) Date of Patent: Jul. 30, 2024

(54) CONSUMABLE DRY ICE COOLING

(71) Applicant: Raytheon Company, Waltham, MA (US)

(72) Inventors: Andrew Gamalski, Tucson, AZ (US);
Jaime Robledo, Sahuarita, AZ (US);
Brendon R. Holt, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/816,773

(22) Filed: Mar. 12, 2020

(65) Prior Publication Data
US 2021/0285711 A1 Sep. 16, 2021

(51) Int. Cl.
F25D 3/12 (2006.01)
F25D 3/00 (2006.01)

(52) U.S. Cl.
CPC .............. *F25D 3/12* (2013.01); *F25D 3/005* (2013.01); *F25D 2303/085* (2013.01); *F25D 2400/30* (2013.01)

(58) Field of Classification Search
CPC . F25D 3/12; F25D 3/005; F25D 3/122; F25D 2303/085; F25D 2400/30; F25B 19/005; F25B 2400/23; F25B 2400/02; F25B 2339/024; F25B 2339/021; F25B 43/006; F25B 9/008; F25B 2309/02; F25B 31/006; B05B 1/20; F25J 1/0027; F25J 2205/20; C01B 32/55
See application file for complete search history.

(56) References Cited

U.S. PATENT DOCUMENTS

| | | | | |
|---|---|---|---|---|
| 2,507,866 | A * | 5/1950 | Plesset ................. | C09K 5/08 62/307 |
| 2,674,859 | A * | 4/1954 | Koch ................. | F25D 3/12 62/387 |
| 4,754,610 | A * | 7/1988 | Knodel ................. | F25C 1/00 62/347 |
| 6,578,367 | B1 | 6/2003 | Schaefer et al. | |
| 2013/0301781 | A1 * | 11/2013 | Parvin ................. | F25D 15/00 376/282 |
| 2020/0318862 | A1 * | 10/2020 | Holzwanger ......... | G05D 23/19 |

FOREIGN PATENT DOCUMENTS

| | | | | |
|---|---|---|---|---|
| CN | 209494604 | * | 10/2019 | .......... F04B 17/05 |
| DE | 102013014912 | * | 3/2015 | .............. F25J 1/00 |
| JP | 2019124432 | * | 7/2019 | .............. F25D 9/00 |

OTHER PUBLICATIONS

English Language translation of DE102013014912 (Year: 2015).*
English language translation of JP 2019124432 (Year: 2019).*

* cited by examiner

*Primary Examiner* — Cassey D Bauer
(74) *Attorney, Agent, or Firm* — CANTOR COLBURN LLP

(57) ABSTRACT

Dry ice cooling systems and methods of making dry ice cooling systems are disclosed. According to embodiments, dry ice cooling systems include a compression container including compressed liquid carbon dioxide. The dry ice cooling systems include a dry ice container coupled to the compression container to receive the liquid carbon dioxide and house dry ice as it forms. The dry ice container includes a liquid coolant. Further, the dry ice cooling system includes a heat exchanger to couple a heat-generating source to the dry ice container.

20 Claims, 2 Drawing Sheets

CONSUMABLE DRY ICE COOLING

BACKGROUND

The present disclosure relates to cooling systems, and more particularly, to consumable dry ice cooling systems.

Dry ice, which is the solid form of carbon dioxide, is used as a cooling agent. Dry ice is formed when liquid carbon dioxide is depressurized. Compared to ice formed from water, dry ice has a lower phase transition temperature and does not leave any residue, which makes it advantageous as a cooling agent for frozen foods, for example. For cooling purposes, dry ice is generally produced in blocks or pellet form.

SUMMARY

Dry ice cooling systems and methods of making dry ice cooling systems are disclosed. According to embodiments, dry ice cooling systems include a compression container including compressed liquid carbon dioxide. The dry ice cooling systems include a dry ice container coupled to the compression container to receive the liquid carbon dioxide and house dry ice as it forms. The dry ice container includes a liquid coolant. Further, the dry ice cooling system includes a heat exchanger to couple a heat-generating source to the dry ice container.

According to other embodiments, dry ice cooling systems include a compression container including compressed liquid carbon dioxide. The dry ice cooling systems include a dry ice container coupled to the compression container to receive the liquid carbon dioxide and house dry ice as it forms. The dry ice container includes a liquid coolant and a perforated tube arranged in the liquid coolant to provide a pathway to transfer the liquid carbon dioxide into the liquid coolant. The dry ice container further includes a heat exchanger to couple a heat-generating source to the dry ice container.

Yet, according to other embodiments, methods of making a dry ice cooling system include dispensing a liquid coolant into a dry ice container. Methods further include coupling a compressed container of liquid carbon dioxide to the dry ice container to provide a pathway for the liquid carbon dioxide to flow into the dry ice container. Methods also include coupling a heat exchanger to the dry ice container to couple a heat-generating source to the dry ice container.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
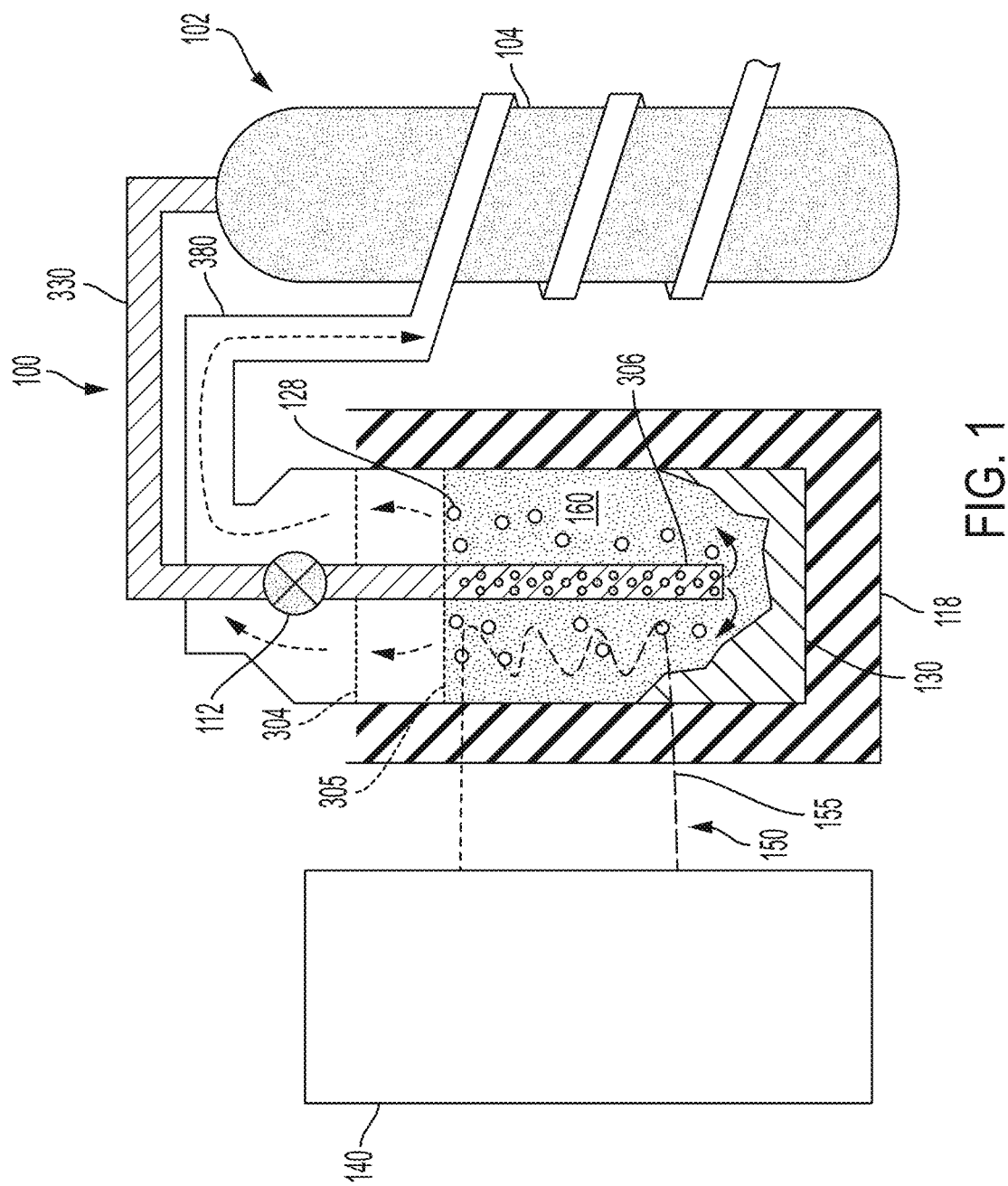
FIG. 1 is a schematic diagram of dry ice cooling system according to aspects of the present invention.

Thermal management systems are needed to cool electronics and other systems in aerospace and missile systems. As the power consumption of radar and other missile electronics, for example, continue to increase, the thermal management system associated with missile designs must accommodate these ever increasing thermal loads. These thermal challenges, coupled with short mission durations, possible long storage periods, and strict volume constraints, leave a narrow solution space for providing effective cooling of mission critical hardware.

Various thermal solutions for cooling electronics applications include air cooling and using a large block of metal as a heat sink. However, such techniques cannot provide rapid cooling needed for missile subsystems which have very high waste heat power, short mission duration applications, and needs to be confined within a missile chassis that has overall limited available volume.

Accordingly, described herein are cooling systems and methods that may provide a solution to these thermal challenges, which include using a consumable carbon dioxide coolant that is stored at room temperature (as a compressed liquid), decompressed and converted into dry ice when needed. This block of dry ice sublimates to a gas when heated. The gaseous $CO_2$ can be vented away, from the missile for example, which provides a pathway for the heat to escape. The liquid carbon dioxide, held under pressure, passes through an expansion valve to generate dry ice. The dry ice is collected in a cavity/container containing a coolant, an alcohol for example, with a very low freezing point (to improve heat transfer with the dry ice). As the dry ice/coolant mixture is heated, the $CO_2$ gradually sublimates as heat is exchanged via a coolant loop that utilizes a liquid coolant (also likely an alcohol or any working fluid with a very low freezing point). The sublimated dry ice (as carbon dioxide gas) is ejected from the system to provide a pathway to remove the heat from the system. The thermal energy from the heat generating source drives the solid to gas phase transition (sublimation). During this phase transition, the working fluid (for example, ethanol, isopropanol, or acetone for example) is chilled to about the sublimation temperature of dry ice (−78.5° C.). The relatively high enthalpy of sublimation of dry ice (571 J/g) means, per unit mass, it can adsorb a significant amount of energy.

The systems and methods provide a consumable dry ice cooling system that can be stored in a cylinder as a compressed liquid and used as needed. The consumable systems can be used in a variety of applications where on-demand cooling is needed, including but not limited to, missile systems (e.g., radio frequency (RF) power electronics cooling, long range communication/data links, general circuit card assembly (CCA) cooling), directed energy weapons, battery pack cooling for aerial drones, and mobile radar that requires a "burst" cooling mode during unusually high power operation.

FIG. 1 is a schematic diagram of dry ice cooling system 100. The dry ice cooling system 100 includes a compression container 102 of compressed liquid carbon dioxide 104. The compression container 102 includes a valve 112 that maintains the compression container 102 under pressure. The pressure of the compression container 102 is maintained at about 800 pounds per square inch (psi) to about 1800 psi according to an aspect.

The valve 112 is an expansion valve, such as a manual or controlled valve, that can be opened or closed when dry ice cooling is needed. To depressurize the liquid carbon dioxide 104, the valve 112 is opened. The liquid carbon dioxide 104 travels from the compression container 102 and through outlet line 330, the valve 112, and holes of the perforated dip tube 306 into dry ice catch container 118 of coolant 160, such as a liquid coolant.

As dry ice 130 is cold, with a sublimation temperature of −78.5° C., the coolant 160 in the dry ice catch container 118 must have a low freezing point. Non-limiting examples of liquid coolants 160 with low freezing points include alcohols, such as ethanol, isopropanol, acetone, an ethylene glycol and water mixture, or a combination thereof. The coolant 160 can be mixed or diluted with water.

According to an aspect, the coolant 160 is ethanol. Ethanol has advantages because it is non-toxic, inexpensive, a low freezing point (i.e., −114.1° C.) and has a higher specific heat capacity than air (i.e., 2.46 J/g ° C. for ethanol versus 1.0 J/g ° C.). Moreover, ethanol is a liquid. Employing a liquid as the medium to capture the dry ice in the ice catch is advantageous since liquids generally have superior thermal transport properties compared to stagnant gasses. Specifically, liquids have significantly higher heat transfer coefficients (e.g., typically about 50-500 W/m$^{2\circ}$ C. for stagnant liquids) compared to stagnant air (e.g., typically about 1-15 W/m$^{2\circ}$ C.). This means it is easier (less effective thermal resistance) to extract heat from the heat-generating device 140 (thermal load) to the cold dry ice 130 source located in the dry ice catch container 118 (cold trap).

The perforated dip tube 306 passes through filter 304, which can be a carbon dioxide snow filter, and a phase separator membrane 305. The filter 304 and phase separator membrane 305 ensure that the coolant does not splash out of the dry ice catch container 118 when the compressed liquid carbon dioxide 104 is vented.

The carbon dioxide 104 flows through the perforated dip tube 306 into the coolant 160. The perforated dip tube 306 includes a plurality of holes that provides a pathway to transfer the liquid carbon dioxide 104 into the coolant 160. As liquid carbon dioxide 104 is depressurized (e.g., at atmospheric pressure) and is bubbled into the coolant 160, dry ice 130 is formed in the dry ice catch container 118.

A heat-generating source 140 is coupled to the dry ice 130 coolant 160 mixture in the container 118 via a heat exchanger 150. The heat-generating source 140 is any electronic or other device/component that generates heat. According to an aspect, the heat-generating source 140 is an electronic device. According to another aspect, the heat-generating source 140 is part of a missile system, part of a directed energy weapon, a battery pack, part of a mobile radar, or a combination thereof.

The heat exchanger 150 can be a heat exchanger loop with another coolant 155 that exchanges heat between the heat-generating source 140 and the dry ice 130 in the dry ice catch container 118. The coolant 155 in the heat exchanger 150 can be the same as the coolant 160, or different than the coolant 160. Non-limiting examples of coolants 155 include ethanol, isopropanol, acetone, an ethylene glycol and water mixture, or a combination thereof. The coolant 155 can be mixed or diluted with water. According to an aspect, the coolant 155 is ethanol.

As heat from the heat-generating source 140 transfers into dry ice catch container 118 with the dry ice 130, the energy goes into the phase transition (sublimation) from solid dry ice 130 to gaseous carbon dioxide 128, which is ejected through the exhaust pathway 380.

Ejection of the carbon dioxide gas 128 provides a pathway to remove/vent heat, in the form of carbon dioxide gas 128, from the system 100. The exhaust pathway 380 (also referred to as a heat ejection pathway) can be an exhaust loop that wraps around either the dry ice catch container 118 or the compression container 102. When the exhaust loop is wrapped around the compression container 102, the gaseous carbon dioxide 128 provides regenerative cooling of the cylinder, ensuring the $CO_2$ stays in a liquid rather than supercritical state. Cooling the cylinder is relevant if the compression container 102 (cylinder) was initially above carbons dioxide's supercritical transition temperature of 31.0° C. when dry ice generation is initiated. A cool cylinder helps ensure the maximum compressed carbon dioxide to dry ice conversion efficiency.

Methods of making the dry ice cooling system 100 include dispensing a liquid coolant 160, such as an alcohol, into a dry ice catch container 118. The methods include connecting a compression container 102 of liquid carbon dioxide 104 to the dry ice catch container 118 to provide a pathway for the liquid carbon dioxide 104 to flow into the dry ice catch container 118. The dry ice catch container 118 is maintained at a pressure lower than a pressure of the compression container 102. The methods include coupling a heat exchanger 150 to the dry ice catch container 118 to couple a heat-generating source 140 to the dry ice catch container 118.

Conversion efficiencies of the described dry ice cooling systems herein are about 20% to about 35% by $CO_2$ mass. The dry ice 130 has various advantages in the dry ice cooling system 100. Dry ice 130 is non-toxic, non-flammable, and inexpensive. Further, dry ice 130 is fairly dense, 1.6 g/cm$^3$, which is advantageous for volume constrained applications. Dry ice 130 has a low sublimation temperature, −78.5° C., and a high enthalpy of sublimation 571 J/g, which provides low temperature cooling and the ability to remove and liberate a large amount of heat.

EXAMPLES

The following non-limiting examples further illustrate the various embodiments described herein.

Figure 2:
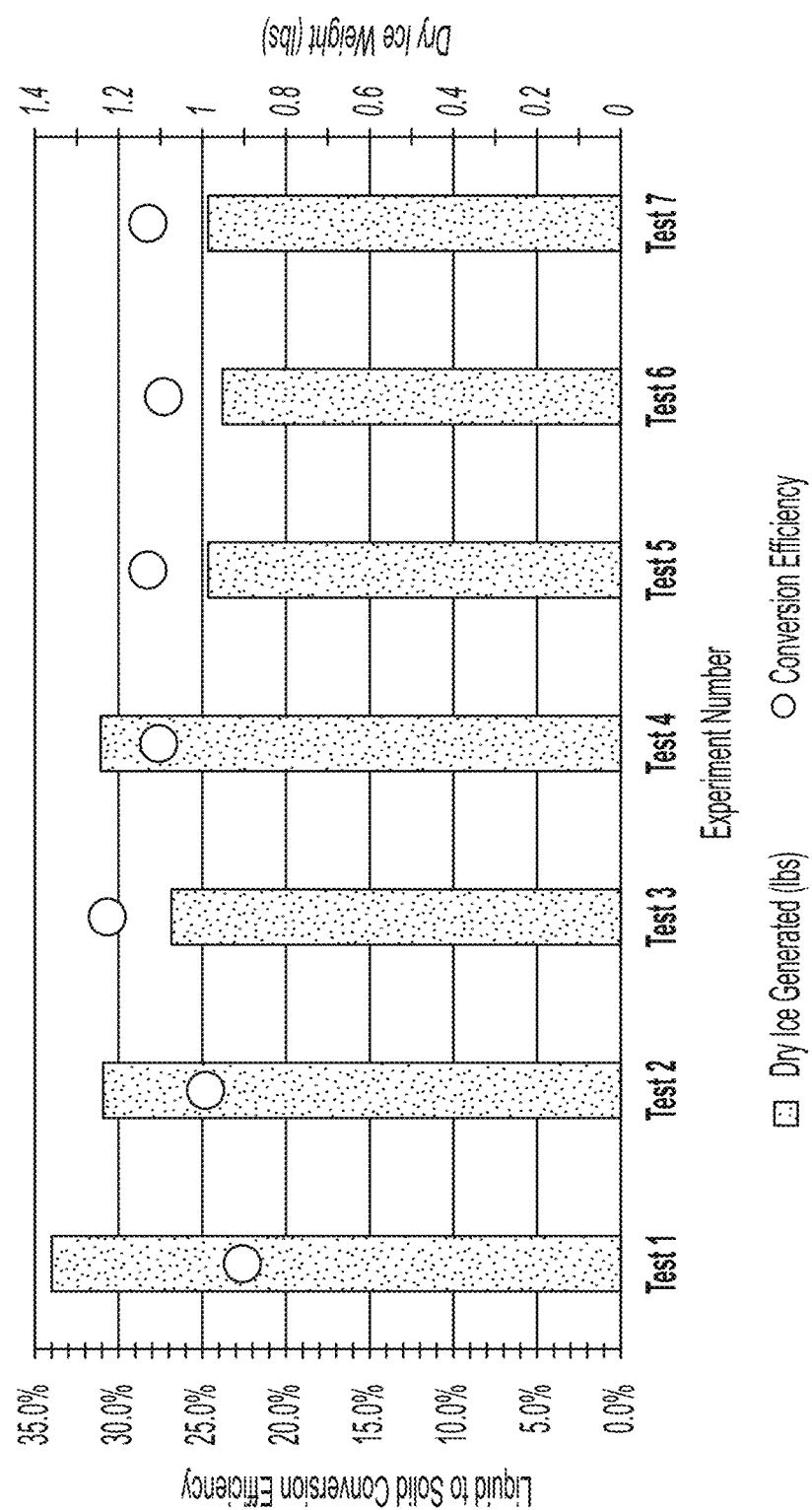
FIG. 2 is a graph showing dry ice conversion efficiency and total dry ice generated according to aspects of the present invention.

Liquid carbon dioxide was converted to solid dry ice by methods described herein. FIG. 2 is a graph showing the dry ice conversion efficiency. For each experiment (tests 1-8), liquid to solid carbon dioxide (dry ice) conversion efficiency (left vertical axis, circles) and dry ice generated (pounds (lbs)) (right vertical axis, bars) were measured. The average conversion efficiency was 27.1%. The average dry ice generated was 1.1 lbs.

The terms "a" and "an" do not denote a limitation of quantity, but rather denote the presence of at least one of the referenced item.

The term "or" means "and/or."

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

"Optional" or "optionally" means that the subsequently described event or circumstance may or may not occur, and that the description includes instances where the event occurs and instances where it does not.

The modifier "about" used in connection with a quantity is inclusive of the stated value and has the meaning dictated by the context (e.g., includes the degree of error associated with measurement of the particular quantity).

The endpoints of all ranges directed to the same component or property are inclusive of the endpoints, are independently combinable, and include all intermediate points and ranges.

The suffix "(s)" as used herein is intended to include both the singular and the plural of the term that it modifies, thereby including one or more of that term (e.g., the colorant(s) includes one or more colorants).

The terms "first," "second," and the like, "primary," "secondary," and the like, as used herein do not denote any order, quantity, or importance, but rather are used to distinguish one element from another.

The terms "front," "back," "bottom," and/or "top" are used herein, unless otherwise noted, merely for convenience of description, and are not limited to any one position or spatial orientation.

The term "combination" is inclusive of blends, mixtures, alloys, reaction products, and the like.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A dry ice cooling system, comprising:
    a compression container comprising compressed, consumable liquid carbon dioxide at a pressure of about 800 pounds per square inch (psi) to about 1800 psi;
    a dry ice container coupled to the compression container to receive the liquid carbon dioxide and house dry ice as it forms, the dry ice container comprising a liquid coolant;
    a heat exchanger to couple a heat-generating source to the dry ice container; and
    an exhaust pathway to remove carbon dioxide gas that has passed through the liquid coolant in the dry ice container from the dry ice cooling system to remove heat from the system, wherein the exhaust pathway wraps around the compression container.

2. The dry ice cooling system of claim 1, wherein the liquid coolant comprises ethanol, isopropanol, an ethylene glycol and water mixture, acetone, or a combination thereof.

3. The dry ice cooling system of claim 1, further comprising a valve that depressurizes the compressed liquid carbon dioxide in the compression container when opened.

4. The dry ice cooling system of claim 1, wherein the heat-generating source is coupled to the dry ice container by a heat exchanger loop that circulates the liquid coolant.

5. The dry ice cooling system of claim 1, wherein pressure of the dry ice container is about atmospheric pressure.

6. The dry ice cooling system of claim 1, wherein the heat-generating source of is an electronic device, part of a missile system, part of a directed energy weapon, a battery pack, part of a mobile radar, or a combination thereof.

7. The dry ice cooling system of claim 1, wherein the exhaust pathway is a heat ejection pathway to vent carbon dioxide gas.

8. A dry ice cooling system, comprising:
    a compression container comprising compressed, consumable liquid carbon dioxide at a pressure of about 800 pounds per square inch (psi) to about 1800 psi;
    a dry ice container coupled to the compression container to receive the liquid carbon dioxide and house dry ice as it forms, the dry ice container comprising a liquid coolant and a perforated tube arranged in the liquid coolant to provide a pathway to transfer the liquid carbon dioxide into the liquid coolant;
    a heat exchanger to couple a heat-generating source to the dry ice container; and
    an exhaust pathway to remove carbon dioxide gas from the dry ice cooling system that has passed through the liquid in the dry ice container and remove heat from the system, wherein the exhaust pathway wraps around the compression container.

9. The dry ice cooling system of claim 8, wherein the liquid coolant comprises ethanol, isopropanol, an ethylene glycol and water mixture, acetone, or a combination thereof.

10. The dry ice cooling system of claim 8, wherein the heat-generating source is coupled to the dry ice container by a heat exchanger loop that circulates the liquid coolant.

11. The dry ice cooling system of claim 8, wherein pressure of the dry ice catch container is about atmospheric pressure.

12. The dry ice cooling system of claim 8, wherein the heat-generating source of is an electronic device, part of a missile system, part of a directed energy weapon, a battery pack, part of a mobile radar, or a combination thereof.

13. The dry ice cooling system of claim 8, wherein the exhaust pathway is a heat ejection pathway to vent carbon dioxide gas.

14. A method of operating a dry ice cooling system, the method comprising:
    dispensing a liquid coolant into a dry ice container;
    coupling a compressed container of consumable liquid carbon dioxide to the dry ice container to provide a pathway for the liquid carbon dioxide to flow into the dry ice container, the compression container with the liquid carbon dioxide at a pressure of about 800 pounds per square inch (psi) to about 1800 psi;

coupling a heat exchanger to the dry ice container to couple a heat-generating source to the dry ice container; and exhausting via an exhaust pathway carbon dioxide gas from the dry ice cooling system that has passed through the liquid in the dry ice container to removed heat from the system, wherein the exhaust pathway wraps around the compression container.

15. The method of claim 14, wherein the liquid coolant comprises an alcohol.

16. The method of claim 15, wherein the alcohol is ethanol, isopropanol, ethylene glycol and water, acetone, or a combination thereof.

17. The method of claim 14, wherein the dry ice container further comprises a perforated tube arranged in the liquid coolant.

18. The method of claim 14, wherein pressure of the dry ice container is about atmospheric pressure.

19. The method of claim 15, wherein the heat-generating source of is an electronic device, part of a missile system, part of a directed energy weapon, a battery pack, part of a mobile radar, or a combination thereof.

20. The method of claim 14, wherein the exhaust pathway is a heat ejection pathway to vent carbon dioxide gas.

* * * * *